(12) United States Patent
Kang et al.

(10) Patent No.: US 11,963,249 B2
(45) Date of Patent: Apr. 16, 2024

(54) BEAM FAILURE RECOVERY METHOD AND APPARATUS IN WIRELESS COMMUNICATION SYSTEM

(71) Applicant: LG ELECTRONICS INC., Seoul (KR)

(72) Inventors: Jiwon Kang, Seoul (KR); Hyungtae Kim, Seoul (KR); Haewook Park, Seoul (KR); Seongwon Go, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/780,172

(22) PCT Filed: Dec. 24, 2021

(86) PCT No.: PCT/KR2021/019793
§ 371 (c)(1),
(2) Date: May 26, 2022

(87) PCT Pub. No.: WO2022/149774
PCT Pub. Date: Jul. 14, 2022

(65) Prior Publication Data
US 2023/0327741 A1    Oct. 12, 2023

(30) Foreign Application Priority Data
Jan. 5, 2021 (KR) .................. 10-2021-0001133

(51) Int. Cl.
*H04W 76/19* (2018.01)
*H04B 7/0408* (2017.01)
(Continued)

(52) U.S. Cl.
CPC .......... *H04W 76/19* (2018.02); *H04B 7/0408* (2013.01); *H04B 7/06968* (2023.05); *H04L 5/0051* (2013.01); *H04W 8/22* (2013.01)

(58) Field of Classification Search
CPC .................................................. H04B 7/06968
(Continued)

(56) References Cited

U.S. PATENT DOCUMENTS

2002/0147163 A1    10/2002 Mckay et al.
2019/0173740 A1    6/2019 Zhang et al.
(Continued)

FOREIGN PATENT DOCUMENTS

CN    110999471    4/2020
KR    102107714    5/2020
(Continued)

OTHER PUBLICATIONS

Extended European Search Report in European Appln. No. 21895913.8, dated Dec. 2, 2022, 11 pages.
(Continued)

*Primary Examiner* — Lihong Yu
(74) *Attorney, Agent, or Firm* — Fish & Richardson P.C.

(57) ABSTRACT

A method and apparatus for performing beam failure recovery in a wireless communication system are disclosed. A method for performing beam failure recovery by a user equipment according to embodiment of the present disclosure may include transmitting, to a base station, capability information including a maximum number of BFD-RSs per a BFD-RS set supported by the UE and receiving, from the base station, configuration information including information related to at least one BFD-RS set, and each of the at least one BFD-RS set may include the maximum number of BFD-RSs or less.

11 Claims, 11 Drawing Sheets

(51) Int. Cl.
*H04B 7/06* (2006.01)
*H04L 5/00* (2006.01)
*H04W 8/22* (2009.01)

(58) Field of Classification Search
USPC .......................................................... 375/267
See application file for complete search history.

(56) References Cited

U.S. PATENT DOCUMENTS

| | | | |
|---|---|---|---|
| 2020/0007678 A1 | 1/2020 | Zhou et al. | |
| 2020/0068644 A1 | 2/2020 | Zhou et al. | |
| 2020/0383167 A1 | 12/2020 | Sengupta et al. | |
| 2021/0051496 A1* | 2/2021 | Nagaraja | H04W 72/54 |
| 2021/0092003 A1 | 3/2021 | Zhou et al. | |
| 2021/0204344 A1 | 7/2021 | Babaci | |
| 2022/0104038 A1 | 3/2022 | Zhou et al. | |
| 2022/0109547 A1 | 4/2022 | Svedman et al. | |
| 2022/0110181 A1 | 4/2022 | Miao | |
| 2022/0174567 A1 | 6/2022 | Awada et al. | |
| 2023/0008664 A1* | 1/2023 | Matsumura | H04L 1/1671 |
| 2023/0046074 A1* | 2/2023 | Zhang | H04B 7/0695 |

FOREIGN PATENT DOCUMENTS

| | | |
|---|---|---|
| WO | WO 2020/146737 | 7/2020 |
| WO | WO2020160304 | 8/2020 |
| WO | WO 2020/246014 | 12/2020 |

OTHER PUBLICATIONS

Apple Inc., "On Multi-TRP Beam Management Enhancement," R1-2103091, Presented at 3GPP TSG-RAN WG1 Meeting #104b-e, e-Meeting, Apr. 12-20, 2021, 6 pages.

CATT, "Summary on beam management for simultaneous multi-TRP transmission with multiple Rx panels," R1-2009500, Presented at 3GPP TSG RAN WG1 Meeting #103-e, e-Meeting, Oct. 26-Nov. 13, 2020, 40 pages.

MediaTek Inc., "Summary 2 on Remaing issues on Beam Failure Recovery," R1-1807796, Presented at 3GPP TSG RAN WG1 Meeting #93, Busan, Korea, May 21-25, 2018, 29 pages.

Convida Wireless, "On Beam Failure Recovery for Scell," R1-1903159, Presented at 3GPP TSG-RAN WG1 Meeting #96, Athens, Greence, Feb. 25-Mar. 1, 2019, 6 pages.

MediaTek Inc., "Enhancement on beam management for multi-TRP," R1-2008957, 3GPP TSG RAN WG1 #103-e, e-Meeting, Oct. 26-Nov. 13, 2020, 9 pages.

Moderator (CATT), "Moderator summary on round #3 discussions," R1-2009728, 3GPP TSG RAN WG1 Meeting #103-e, e-Meeting, Oct. 26-Nov. 13, 2020, 15 pages.

Office Action in Japanese Appln. No. 2022-538876, dated Apr. 18, 2023, 5 pages (with English translation).

Office Action in U.S. Appl. No. 18/158,913, dated Apr. 26, 2023, 4 pages.

Qualcomm Incorporated, "Enhancements on Multi-beam Operation," R1-1912968, 3GPP TSG-RAN WG1 Meeting #99, Reno, Nevada, US, Nov. 18-22, 2019, 19 pages.

Notice of Allowance in Chinese Appln. No. 202180007566.5, mailed on Nov. 5, 2023, 8 pages (with English translation).

* cited by examiner

BEAM FAILURE RECOVERY METHOD AND APPARATUS IN WIRELESS COMMUNICATION SYSTEM

CROSS-REFERNECE TO RELATED APPLICATIONS

This application is a National Phase Application under 35 U.S.C. § 371 of International Application No. PCT/KR2021/019793, filed Dec. 24, 2021, which claims the benefit of Korean Patent Application No. 10-2021-0001133, filed on Jan. 5, 2021. The disclosures of the prior applications are hereby incorporated by reference herein in their entirety.

TECHNICAL FIELD

The present disclosure relates to a wireless communication system, and in more detail, relates to a beam failure recovery method and apparatus in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus for performing beam failure recovery in a wireless communication system.

In addition, an additional technical object of the present disclosure is to provide a method and an apparatus for performing beam failure recovery based on the number of beam failure detection reference signals supported by a terminal.

The technical objects to be achieved by the present disclosure are not limited to the above-described technical objects, and other technical objects which are not described herein will be clearly understood by those skilled in the pertinent art from the following description.

Technical Solution

As an embodiment of the present disclosure, a method for performing beam failure recovery (BFR) by a user equipment (UE) in a wireless communication system may include transmitting, to a base station, capability information including a maximum number of BFD-RSs (beam failure detection-reference signals) per a BFD-RS set supported by the UE; and receiving, from the base station, configuration information including information related to at least one BFD-RS set, and each of the at least one BFD-RS set may include the maximum number of BFD-RSs or less.

As another embodiment of the present disclosure, a method for performing beam failure recovery (BFR) by a base station in a wireless communication system may include receiving, from a user equipment (UE), capability information including a maximum number of BFD-RSs (beam failure detection-reference signals) per a BFD-RS set supported by the UE; and transmitting, to the UE, configuration information including information related to at least one BFD-RS set, and each of the at least one BFD-RS set may include the maximum number of BFD-RSs or less.

Technical Effects

According to an embodiment of the present disclosure, a method and an apparatus for performing beam failure recovery may be provided in a wireless communication system.

According to an embodiment of the present disclosure, a method and an apparatus for performing beam failure recovery based on the number of beam failure detection reference signals supported by a terminal may be provided.

According to an embodiment of the present disclosure, a beam failure recovery operation in a frequency band in which a control resource set in which a plurality of transmission configuration indicators are configured may be supported.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
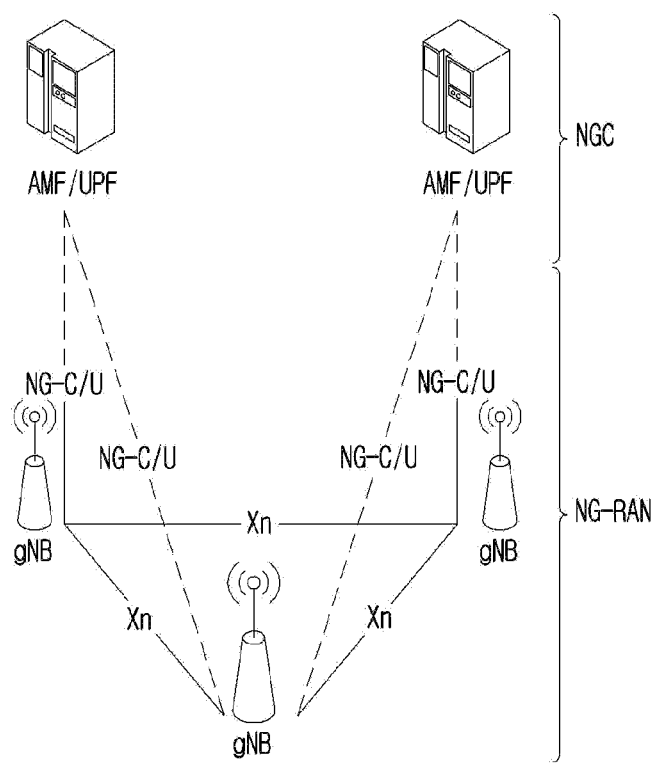
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.
- BM: beam management
- CQI: Channel Quality Indicator
- CRI: channel state information—reference signal resource indicator
- CSI: channel state information
- CSI-IM: channel state information—interference measurement
- CSI-RS: channel state information—reference signal
- DMRS: demodulation reference signal
- FDM: frequency division multiplexing
- FFT: fast Fourier transform
- IFDMA: interleaved frequency division multiple access
- IFFT: inverse fast Fourier transform
- L1-RSRP: Layer 1 reference signal received power
- L1-RSRQ: Layer 1 reference signal received quality
- MAC: medium access control
- NZP: non-zero power
- OFDM: orthogonal frequency division multiplexing
- PDCCH: physical downlink control channel
- PDSCH: physical downlink shared channel
- PMI: precoding matrix indicator
- RE: resource element
- RI: Rank indicator
- RRC: radio resource control
- RSSI: received signal strength indicator
- Rx: Reception
- QCL: quasi co-location
- SINR: signal to interference and noise ratio
- SSB (or SS/PBCH block): Synchronization signal block (including PSS (primary synchronization signal), SSS (secondary synchronization signal) and PBCH (physical broadcast channel))
- TDM: time division multiplexing
- TRP: transmission and reception point
- TRS: tracking reference signal
- Tx: transmission
- UE: user equipment
- ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
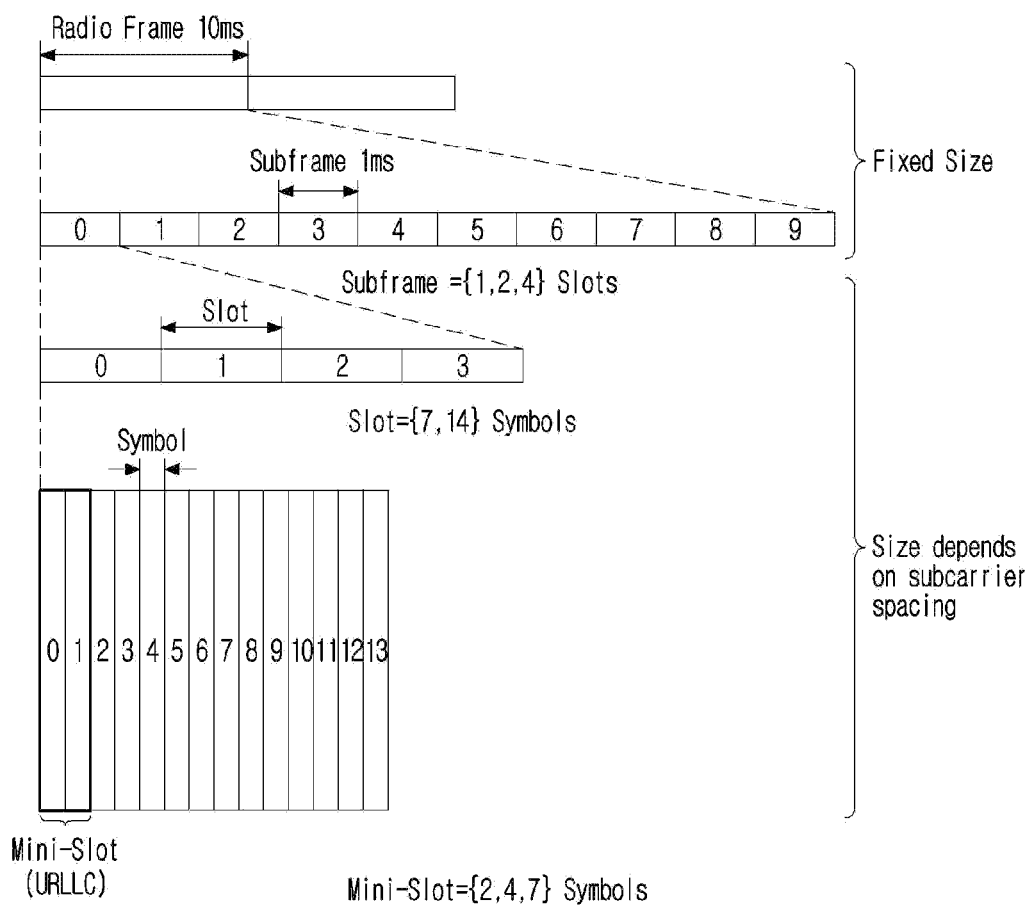
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, µ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| µ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

Figure 3:
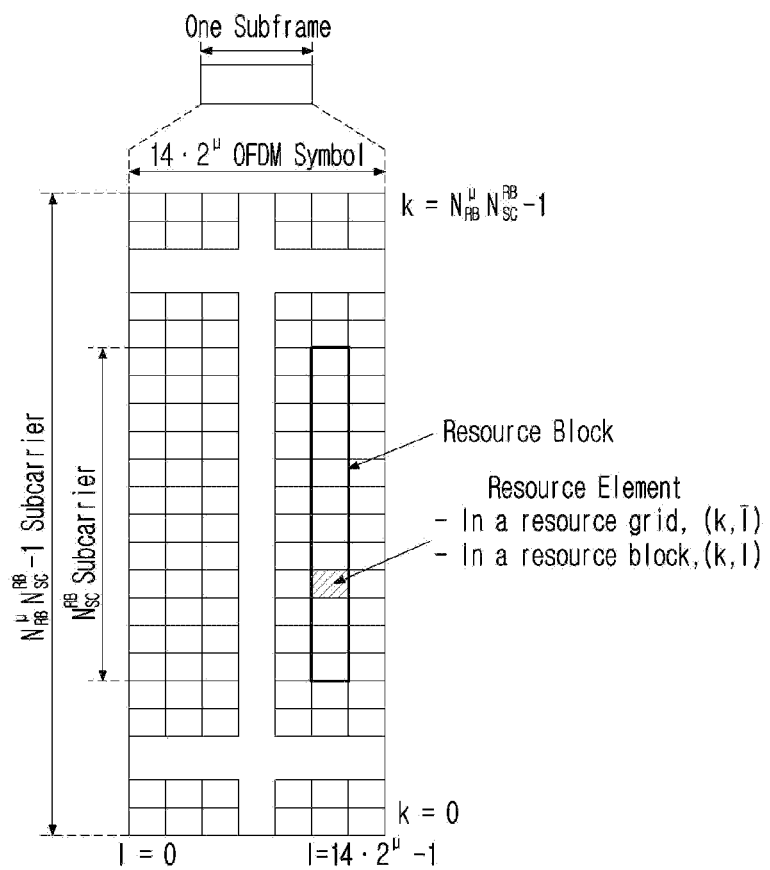
FIG. 3 illustrates a resource grid in a wireless communication system to which the present disclosure may be applied.

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing. FIG. 3 illustrates a resource grid in a wireless communication system to which the present disclosure may be applied. In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, $k=0, \ldots, N_{RB}^\mu N_{sc}^{RB}-1$ is an index in a frequency domain and $l'=0, \ldots, 2^\mu N_{symb}^{(\mu)}-1$ refers to a position of a symbol in a subframe. When referring to a resource element in a slot, an index pair (k,l) is used. Here, $l=0, \ldots, N_{symb}^\mu - 1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^\mu$ and a resource element (k,l) for a subcarrier spacing configuration μ in a frequency domain is given as in the following Equation 1.

$$n_{CRB}^\mu = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu}=n_{PRB}^{\mu}+N_{BWP,i}^{start,\mu} \quad \text{[Equation 2]}$$

$N_{BWP,i}^{start,\mu}$ is a common resource block that a BWP starts relatively to common resource block 0.

Figure 4:
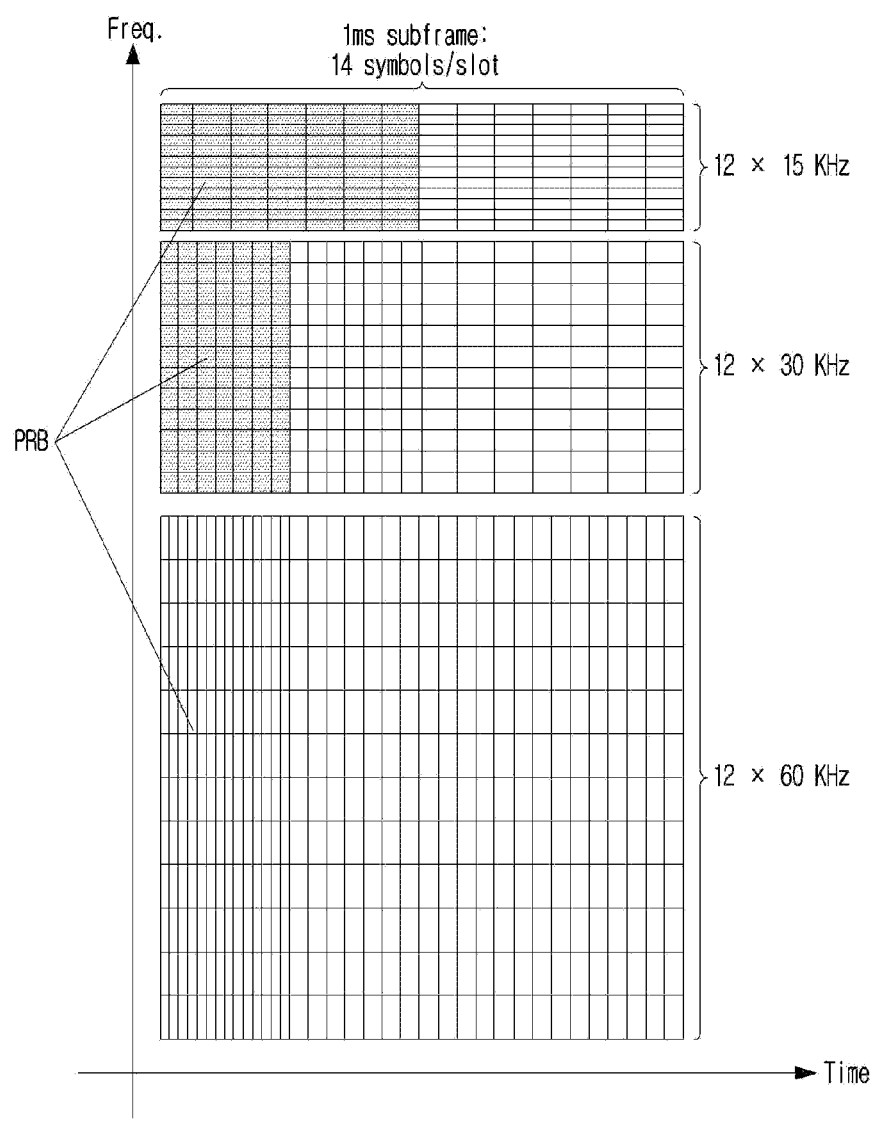
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
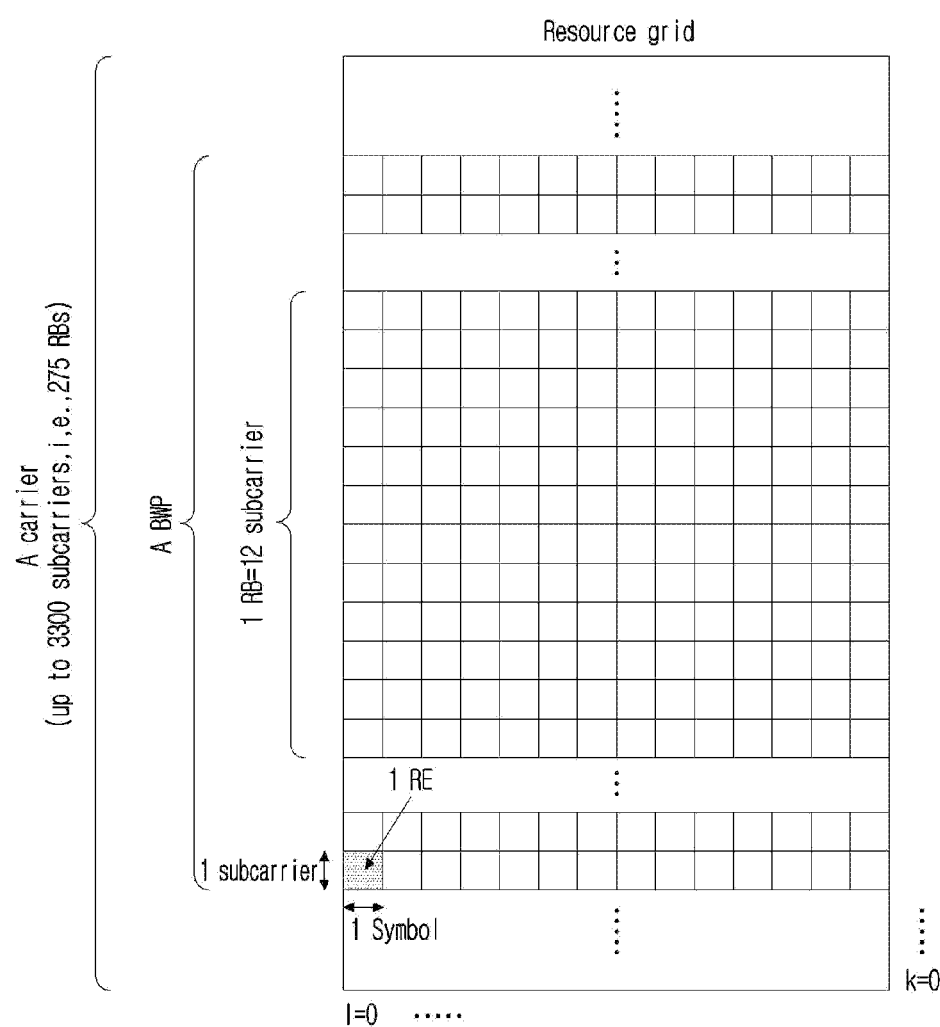
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
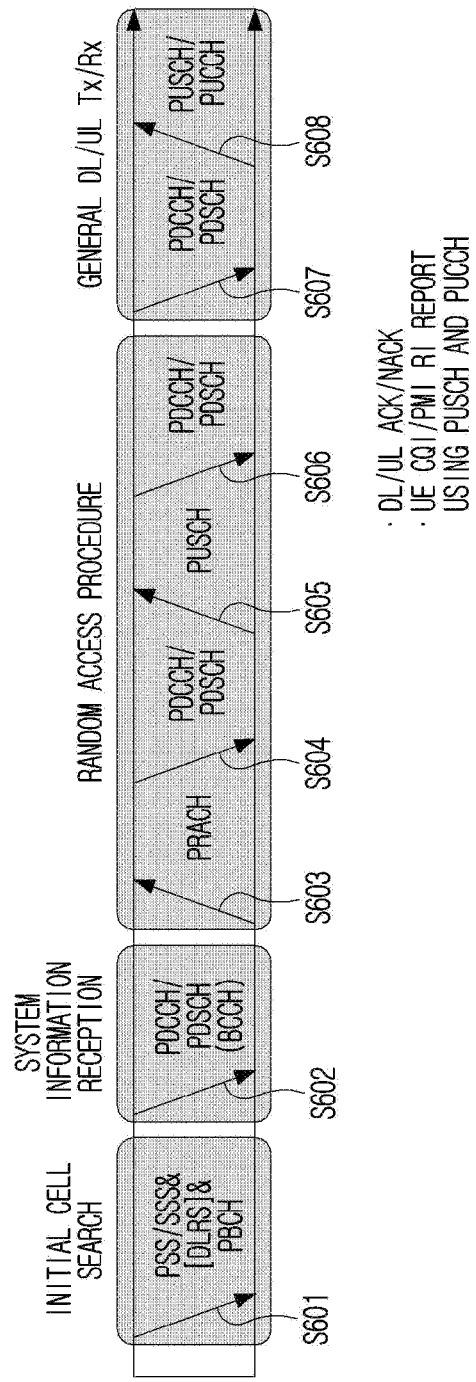
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted. DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted. DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Figure 7:
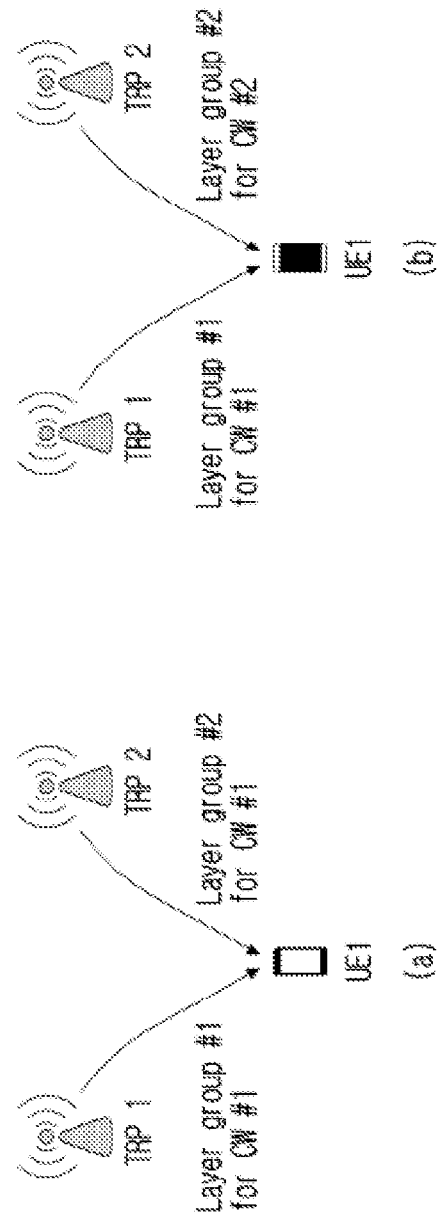
FIG. 7 illustrates a method of transmitting multiple TRPs in a wireless communication system to which the present disclosure may be applied.

FIG. 7 illustrates a method of multiple TRPs transmission in a wireless communication system to which the present disclosure may be applied.

In reference to FIG. 7(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method and/or a TDM (time division multiplexing) method.

Basic Beam Failure Recovery (BFR)

The UE and/or the base station may perform uplink/downlink beam management (BM) for data transmission/reception. Here, BM may refer to a process of obtaining and maintaining a beam set that can be used for downlink and uplink transmission/reception.

Specifically, BM may include a beam measurement process of measuring the characteristics of a beamforming signal received from a base station or a UE, a beam determination process of determining a transmission beam (Tx beam) and a reception beam (Rx beam) of the base station or the terminal itself, a beam sweeping process of covering a spatial region using a transmit beam and/or a receive beam for a predetermined time interval in a predetermined manner, and a beam reporting process in which the UE reports information of the beam signal to the base station based on the beam measurement result.

While the above-described uplink/downlink BM process is performed, a beam mismatch problem may occur due to various factors. For example, when the UE moves or rotates, or when a radio channel environment is changed due to movement of a nearby object (e.g., when it was a line-of-sight (LoS) environment and then changed to a non-LoS environment as the beam was blocked), an optimal uplink/downlink beam pair may be changed. At this time, when the UE or the base station fails to track the changed optimal uplink/downlink beam pair (i.e., BM tracking), it may be considered that a beam failure has occurred.

The UE may determine whether beam failure has occurred based on the reception quality of a downlink reference signal (RS). In addition, the UE must report a report message on whether beam failure has occurred or a message for a beam recovery request (beam failure recovery request message, BFRQ message) to the base station. Upon receiving the message, the base station may perform a beam recovery process through various processes such as beam RS transmission or beam report request for beam recovery. This series of beam recovery processes is called a beam failure recovery (BFR) process.

The basic BFR operation includes a BFR process for a special cell (SpCell) (i.e., a primary cell, PCell) or a primary secondary cell (PScell) in which a contention-based PRACH resource exists. The BFR process may consist of a beam failure detection (BFD) process of the UE, a BFRQ transmission process, and a process of monitoring the response of the base station to the BFRQ, and each process may be performed in a serving cell.

Beam Failure Detection (BFD)

When the quality value (Q_out) of all PDCCH beams falls below a predefined value, it may be considered that one beam failure instance has occurred. Here, the quality value may be determined based on a hypothetical block error rate (BLER). That is, the theoretical BLER may mean a probability that demodulation of the control information fails when the control information is transmitted on a specific PDCCH.

In addition, one or a plurality of search spaces for monitoring the PDCCH may be configured in the UE, and a PDCCH beam may be configured differently for each search space. In this case, when the quality values of all PDCCH beams fall below the predefined value, it means that the quality values of all PDCCH beams fall below the BLER threshold.

Two methods, which will be described later, may be supported as a method for the UE to receive an indication/configuration of a BFD-RS from the base station for determining whether a beam failure instance has occurred.

As a first method, an implicit configuration method of BFD-RS may be supported. A control resource set (CORESET) ID, which is a resource region in which the PDCCH may be transmitted, is configured in each search space, and RS information (e.g., CSI-RS resource ID, SSB ID) QCLed in terms of spatial RX parameters may be indicated/configured for each CORESET ID. In view of spatial reception parameters, the QCLed RS may be indicated or configured through transmit configuration information (TCI). That is, the BFD-RS may be implicitly configured/indicated to the UE based on QCL information indicated or configured through TCI.

Here, when the base station indicates or configures the RS (i.e., QCL Type D RS) that is QCL from the point of view of the spatial reception parameter to the UE, when the UE receives a specific PDCCH DMRS, the beam used for reception of the RS that is QCL from the point of view of the spatial reception parameter may be used. That is, a signal may be transmitted between spatially QCLed antenna ports through the same transmission beam or similar transmission beams (e.g., when beam widths are different while beam directions are the same/similar).

As a second method, an explicit configuration method of the BFD-RS may be supported. The base station may explicitly configure or indicate the UE to use the beam RS for BFD. In this case, the beam RS may correspond to the 'all PDCCH beams'.

The UE physical layer may inform the MAC sublayer that the BFI (beam failure instance) has occurred whenever an event in which the theoretical BLER measured based on the configured (or indicated) BFD-RS deteriorates beyond a specific threshold value occurs. And, when BFI occurs a certain number of times (e.g. 'beamFailureInstanceMaxCount') within a certain time (e.g., 'BFD timer'), the UE MAC sublayer may determine that a beam failure has occurred and initiate a related RACH operation.

BFRQ (PRACH Based): New Beam Identification and PRACH Transmission

As described above, when more than a certain number of BFIs are generated, the UE may determine that a beam failure has occurred, and may perform a beam failure recovery operation. The UE may perform a BFRQ process based on RACH (i.e., PRACH) as an example of a beam failure recovery operation. Hereinafter, the corresponding BFRQ process will be described in detail.

When a beam failure occurs, the base station may configure a candidate beam RS list ('candidateBeamRSList') including replaceable candidate beam RSs to the terminal through RRC signaling. And, the base station may configure a dedicated PRACH resource for the candidate beam RSs. In this case, the dedicated PRACH resource may be a non-contention based PRACH resource (or a contention free PRACH resource). When an alternative beam RS is not found in the candidate beam RS list, the UE may select at least one of preset SSB resources. And, the UE may transmit a contention-based PRACH to the base station based on at least one selected.

Enhanced Beam Failure Recovery

When carrier aggregation (CA) is applied, there may be no uplink carrier (UL carrier) in a specific SCell. That is, in the case of an SCell having only a downlink carrier, uplink transmission is impossible. And, even if there is an uplink carrier in the SCell, the contention-based PRACH cannot be configured. Therefore, the PRACH-based BFR process to which CA is applied may be limitedly applied only to the SpCell (PCell or PSCell), and the BFR process may not be supported for the SCell. That is, according to the basic BFR operation, the PRACH-based BFR operation in the SpCell may not be supported in the SCell.

Specifically, when a high-frequency band requiring BFR is configured to the SCell, the PRACH-based BFR process may not be supported in the corresponding high-frequency band. For example, when the PCell is operated in a low frequency band (e.g., 6 GHz or less) and the SCell is operated in a high frequency band (e.g., 30 GHz), there is a problem that the PRACH-based BFR process is not supported in a high-frequency band that requires more BFR support.

In order to solve the above-mentioned problem, the improved BFR operation includes an operation for the BFR of the SCell. For example, the UE may perform BFRQ for the SCell by using a dedicated PUCCH resource for BFRQ configured in the SpCell. Hereinafter, the 'dedicated PUCCH resource' will be referred to as BFR-PUCCH for convenience of description.

The role of the BFR-PUCCH is to report only 'BF occurrence information for SCell' to the base station. And, detailed information related to the generated BF may be transmitted to the base station through the BFR MAC-CE or UCI as a subsequent report.

Here, the detailed information transmitted as the follow-up report may include information on the SCell(s) in which BF has occurred, whether or not there is a new candidate beam for the SCell(s) in which BF has occurred, and (if there is a new candidate beam) the corresponding beam RS ID.

In addition, the BFR-PUCCH may use the same PUCCH format as an SR (scheduling request), and may be defined through the ID of a specific SR for BFR use. If the UL-SCH allocated from the base station exists when the UE detects the BF for the SCell, the UE may omit the BFR-PUCCH transmission procedure like the SR transmission procedure, and transmit the BFR MAC-CE to the base station through the directly allocated UL-SCH.

Downlink Multiple-TRP (Multiple TRP, M-TRP) URLLC Transmission Operation

In the basic MIMO system, a single DCI-based or multiple DCI-based PDSCH transmission operation was applied. In the improved MIMO system, M-TRP transmission (e.g., PDCCH, PUCCH, PUSCH, etc.) operations other than PDSCH may be applied.

The DL M-TRP URLLC transmission method refers to a method in which multiple TPRs transmit the same data/DCI using different spaces (e.g., layer/port)/time/frequency resources. For example, TRP 1 may transmit specific data/DCI in resource 1, and TRP 2 may transmit the specific data/DCI (i.e., same data/DCI) in resource 2.

That is, when the DL M-TRP URLLC transmission method is configured, the UE may receive the same data/DCI using different space/time/frequency resources. In this case, the UE may receive an indication of the QCL RS/type (i.e., DL TCI state) used in the space/time/frequency resource for receiving the corresponding data/DCI from the base station.

For example, when the corresponding data/DCI is received in resource 1 and resource 2, the UE may be indicated by the base station of the DL TCI state used in resource 1 and the DL TCI state used in resource 2 from the base station. By receiving the corresponding data/DCI through the resource 1 and the resource 2, the UE may achieve high reliability (reliability). This M-TRP URLLC transmission scheme may be applied to PDSCH/PDCCH.

In addition, in describing the present disclosure, when receiving data/DCI/UCI through a specific space/time/frequency resource, using (or mapping) a specific TCI state may mean (for DL) estimating a channel from DMRS using QCL type and QCL RS indicated by a specific TCI state in a specific space/time/frequency resource, and receiving/demodulating data/DCI/UCI with the estimated channel.

The M-TRP eMBB transmission method refers to a method in which M-TRP transmits different data/DCI using different space/time/frequency resources. If the M-TRP eMBB transmission method is configured, it may be assumed that the UE may be indicated by the base station for a plurality of TCI states through DCI, and data received using QCL RSs indicated by each of the plurality of TCI states are different from each other.

In addition, since the RNTI for M-TRP URLLC and the M-TRP eMBB RNTI are separately used, the UE may determine whether a specific transmission/reception is M-TRP URLLC transmission/reception or M-TRP eMBB transmission/reception. For example, when RNTI for URLLC is used and CRC masking is performed for DCI, the UE may determine the corresponding transmission as URLLC transmission. In addition, when the RNTI for eMBB is used and CRC masking is performed for DCI, the UE may determine the corresponding transmission as eMBB transmission. As another example, the base station may configure the M-TRP URLLC transmission/reception method or the M-TRP eMBB transmission/reception method to the terminal through new signaling.

For convenience of description of the present disclosure, it has been assumed that 2 TRPs cooperate with each other to perform a transmission/reception operation, but the present disclosure is not limited thereto. That is, the present disclosure may be extended and applied even in a multi-TRP environment of 3 or more, and may be extended and applied even in an environment in which transmission/reception is performed in different panels or beams in the same TRP. The UE may recognize different TRPs as different TCI states. When the UE transmits/receives data/DCI/UCI using TCI state 1, it means that it transmits/receives data/DCI/UCI/ from TRP 1 (or to TRP 1).

In addition, in describing the present disclosure, the meaning that a plurality of base stations (i.e., M-TRP) repeatedly transmit the same PDCCH may mean that the same DCI is transmitted through a plurality of PDCCH candidates, and is identical to the meaning that a plurality of base stations repeatedly transmit the same DCI. Here, two DCIs having the same DCI format/size/payload may be viewed as the same DCI.

Alternatively, if the scheduling results are the same even if the payloads of the two DCIs are different, the two DCIs may be regarded as the same DCI. For example, the time domain resource allocation (TDRA) field of DCI may relatively determine the slot/symbol position of data and the slot/symbol position of A (ACK)/N(NACK) based on the reception time of the DCI. In this case, when the DCI received at time n and the DCI received at time n+1 indicate the same scheduling result to the UE, the TDRA fields of the two DCIs are different, and as a result, the DCI payload is different from each other. Accordingly, even if the payloads of the two DCIs are different, if the scheduling results are the same, the two DCIs may be regarded as the same DCI.

Alternatively, even if the payloads of the two DCIs are different and the scheduling results are not the same, when the scheduling result of one DCI is a subset of the scheduling result of the other DCI, the two DCIs may be regarded as the same DCI. For example, when the same data is TDM and repeatedly transmitted N times, DCI 1 received before the first data indicates N times data repetition (or scheduling), and DCI 2 received before the second data indicates N−1 data repetition (scheduling). In this case, the scheduling result (or data) of DCI 2 becomes a subset of the scheduling result (or data) of DCI 1, and both DCIs have scheduling results for the same data. Accordingly, even in this case, the two DCIs may be regarded as the same DCI.

And, in describing the present disclosure, dividing and transmitting the same PDCCH by a plurality of base stations (i.e., M-TRP) may mean that one DCI is transmitted through one PDCCH candidate, but TRP 1 transmits some resources defined for the corresponding PDCCH candidate, and TRP 2 transmits the remaining resources.

As an M-TRP URLLC transmission method, a method in which each TRP transmits the same PDSCH/PDCCH in different space/time/frequency resources, as well as a method of transmitting the same PDSCH/PDCCH in the same space/time/frequency resource in duplicate (i.e., single frequency network (SFN) transmission method) may be applied. In the case of the SFN transmission method, since a plurality of TRPs may transmit the same PDCCH/PDSCH DMRS port together, a plurality of TCI states may be configured/indicated for the same PDCCH/PDSCH. In particular, in order to apply the SFN transmission method to PDCCH transmission, the existing method in which one TCI state is indicated per CORESET may be changed to a method in which a plurality of TCI states are indicated per CORESET.

M-TRP BFR Related Operation

When the above-described basic BFR operation or the enhanced BFR operation is directly applied to the M-TRP transmission environment, even if a beam failure occurs in a specific CORESET, the UE may determine that it is not a beam failure situation. For example, if all CORESETs transmitting PDCCH in a specific TRP are in a beam failure situation, or there is a CORESET that is not beam failure among CORESETs transmitting PDCCH in other TRPs, the UE may not determine that the current situation is a beam failure situation.

In order to solve this problem, a TPR-specific BFR method may be applied. That is, when a beam failure occurs for one or more serving beams corresponding to a specific TRP, a TPR-specific BFR method for quickly recovering it may be applied. In the TPR-specific BFR method, when beam failure occurs for one or more partial beams (belonging to a specific TRP) among one or more PDCCH beams or serving beams, it may refer to a method in which the UE reports a beam failure condition to the base station and recovers, that is, a partial BFR method.

In order to apply the M-TRP BFR method, a BFD procedure for a specific TRP or each TRP may be performed independently. To this end, the definition of a specific TRP or a BFD-RS set for each TRP should be determined first.

As with the basic BFR operation or the improved BFR operation described above, the determination method for the BFD-RS set may include an implicit BFD-RS set determination method and an explicit BFD-RS set determination method.

The explicit BFD-RS set determination method may refer to a method in which the base station explicitly configures the BFD-RS set corresponding to each TRP. That is, a plurality of BFD-RS sets corresponding to a plurality of TRPs in the same CC/BWP may be configured by the base station, respectively, and the UE may independently perform a BFD procedure (e.g. BFI count, etc.) for each configured BFD-RS set.

As with the basic BFR operation or the improved BFR operation described above, the implicit BFD-RS set determination method is a method of determining the BFD-RS using the TCI state (or QCL type-D RS in TCI state) configured in CORESET, and is a method of monitoring whether a PDCCH transmission beam has failed or not, technically.

In the basic BFR operation or the improved BFR operation described above, the BFD procedure was performed by configuring the BFD-RS set for all of the CORESETs configured for each CC/BWP. In more enhanced BFR operation, a BFD-RS set (e.g., a BFD-RS set for each TRP) may be configured for some CORESET(s) among a plurality of CORESETs set for each CC/BWP (or by dividing some CORESET(s) by each), and a BFD procedure (e.g., BFI count, etc.) may be performed independently for each BFD-RS set.

The method of dividing a plurality of CORESETs in CC/BWP by TRP may include 1) a method of dividing CORESETs for each TRP based on the CORESET pool configuration introduced for M-TRP PDSCH transmission based on multiple DCI, and 2) a method of dividing CORESETs by TRP based on a separately set CORESET group.

That is, the method 1) is a method of configuring a BFD-RS set based on each CORESET pool index, and the method 2) is a method of configuring each BFD-RS set based on a separately set CORESET group index. The method 2) may support not only TRP-specific BFD but also other use cases (e.g., performing BFR with only some of the serving beams within the same TRP, etc.).

Radio Link Monitoring (RLM) Procedure

While monitoring the downlink radio link quality for the primary cell (PCell or SpCell), if it is determined that the radio link quality is degraded below the threshold value, the UE may report the RLM result to the base station.

Specifically, the downlink radio link quality of the primary cell may be monitored by the UE for the purpose of notifying/indicating an out-of-sync state or an in-sync state to a higher layer. The UE does not need to monitor the downlink radio link quality of the BWP other than the active downlink BWP in the primary cell.

If the active downlink BWP is an initial BWP and is for SS/PBCH block and CORESET multiplexing pattern 2 or 3, when the associated SS/PBCH block index is provided by 'RadioLinkMonitoringRS', which is a higher layer parameter, the UE may perform RLM using the associated SS/PBCH block.

And, for the UE, when the secondary cell group (SCG) is configured, the higher layer parameter 'rlf-TimersAndConstants' is provided, and it is configured to not be released, in the SCG, the downlink radio link quality of the PSCell may be monitored by the UE for the purpose of notifying/indicating an out-of-sync state/in-sync state to a higher layer. The UE does not need to monitor the downlink radio link quality in the DL BWP other than the active downlink BWP in the primary secondary cell.

The UE may be provided with the CSI-RS resource configuration index by the higher layer parameter 'csi-RS-Index' or the SS/PBCH block index by 'ssb-Index'.

When a multi-downlink BWP is configured for the serving cell, the UE may perform a radio link monitoring operation using the RS corresponding to the resource index provided by 'RadioLinkMonitoringRS' for the active downlink BWP. And, if 'RadioLinkMonitoringRS' is not provided for the active downlink BWP, the UE may perform a radio link monitoring operation using RS(s) provided through the active TCI state configured for PDCCH reception in CORESET of the active downlink BWP.

In a frame in which radio link quality is evaluated, if the radio link quality is worse than a threshold (e.g., Qout) for all resources of a resource set for radio link monitoring, the physical layer of the UE may indicate to the higher layer that the state of the radio link is out of synchronization ('out-of-sync'). In the frame in which the radio link quality is evaluated, if the radio link quality is better than the threshold Qin for any resource in the resource set for radio link monitoring, the physical layer of the UE may indicate to an higher layer that the state of the radio link is in a synchronized state ('in-sync').

Configuration Related to RS for BFD (and/or RLM)

If the number of TCI/QCL type-D RS of the entire CORESET set for the UE is greater than the number of maximum RLM (radio link monitoring) RS that the UE can support, the following method may be applied (or defined).

1) Method 1 (CORESET selection method): The CORESET with the shorter minimum monitoring cycle configured in the search space (set) (belonging to each CORESET) is preferentially selected.

2) Method 2 (CORESET selection method): The CORESET with the higher CORESET ID value is preferentially selected.
3) Method 3 (RS selection method in TCI state): When a plurality of RSs are included in a single TCI state, the RS corresponding to QCL type-D is preferentially selected.

Here, method 1 is applied preferentially over method 2. That is, CORESET is preferentially selected based on the minimum monitoring period configured in the search space (set) (that is, method 1 is applied first), and Method 2 may be applied to CORESETs having the same minimum monitoring period configured in the search space (set).

Method 3 may be commonly applied to RLM RS selection and BFD RS selection. For example, if two RSs are included in the activated TCI state for PDCCH reception, the UE may expect one RS to have QCL-Type D, and may use the RS having QCL-Type D for RLM (i.e., method 3 is applied). Here, the UE may not expect both RSs to have QCL-Type D.

As another example, when two RS indexes exist in the TCI state, the BFD-RS set may include an RS index having a QCL-Type D configuration for the corresponding TCI state. Here, the UE may preferentially select an RS index with QCL-Type D configuration.

And, as shown in Table 6 below, according to the value of $L_{max}$, which is the maximum number of SSBs determined by the frequency range of the cell, subcarrier spacing (SCS), FDD/TDD, whether shared spectrum access is applied, etc., an $N_{LR-RLM}$ value that is the maximum number of RSs that can be configured for BFD and RLM purposes may be determined. Here, up to two RSs among the $N_{LR-RLM}$ RSs may be used for BFD purposes, and the maximum $N_{RLM}$ RSs may be used for RLM purposes.

TABLE 6

| $L_{max}$ | $N_{LR-RLM}$ | $N_{RLM}$ |
|---|---|---|
| 4 | 2 | 2 |
| 8 | 6 | 4 |
| 64 | 8 | 8 |

Currently, the methods 1 and 2 are applied to the case where the $L_{max}$ value is 4. And, since RLM is performed only in SpCell, only up to two BFD RSs may be configured/applied in SCell. In the case of the basic BFR operation or the enhanced BFR operation, the maximum number of BFD RSs that the UE can support for each CC/BWP is two. Therefore, when three or more CORESETs are configured for each CC/BWP, method 1 and method 2 (or another method) may be applied, but since the base station can implement up to two TCI state/QCL type-D RSs, the BFD-RS selection method may be further discussed.

In the enhanced MIMO system, in order to support two DCI-based M-TRP transmission method, a plurality of CORESET pools are supported, and the total number of CORESETs configurable for the UE is increased. In addition, in a more enhanced MIMO system, a method in which a plurality of TRPs cooperatively transmit PDCCH/DCI may be applied to improve reliability for PDCCH.

For example, for M-TRP SFN transmission of PDCCH, a plurality of TCI state/QCL type-D RSs may be activated in a single CORESET. As another example, for M-TRP (and/or S-TRP) PDCCH TDM/FDM transmission, a linkage may be established between a plurality of CORESETs/search spaces (sets). In this case, the CORESET/search spaces (sets) in which the linkage is configured may repeatedly transmit the same DCI.

As described above, when the BFD/RLM RS is not explicitly configured for the UE, the UE should monitor the TCI state/QCL type-D RS of the CORESET(s) configured to perform the BFD/RLM operation. Therefore, there is a problem that an increase in the number of CORESETs and/or the number of TCI/QCL type-D RSs of CORESET may cause an increase in the number of RSs to be monitored for BFD/RLM by the UE.

Hereinafter, specific examples of the present disclosure related to the configuration of RS for BFD (and/or RLB use) will be described.

Embodiment 1

When multiple CORESET pools are configured and/or when multiple TCIs are configured in a single CORESET, the UE may report the maximum number of RSs that the UE can support for BFD purpose (or RLM purpose) to the base station using one or more of a plurality of methods (Methods 1 to 4) to be described later. Here, the UE may report the maximum number of RSs that can be supported for BFD use (or RLM use) to the base station as UE capability information.

The UE may report to the base station the maximum number of RSs that the UE can support for BFD purposes (and/or RLM purposes) for each CORESET pool/group (Method 1).

Alternatively, the UE may report to the base station the maximum number of RSs that the UE can support for the BFD purpose (and/or RLM purpose) for the entire CORESET pool/group (Method 2).

Alternatively, the UE may report the maximum number of CORESETs (with a different TCI state or QCL type-D RS) that the UE can support for BFD use (and/or RLM use) for each CORESET pool/group, and may report the maximum number of TCI states/RSs (e.g., 1 or 2) that the UE can support for BFD use (and/or RLM use) per CORESET to the base station (Method 3).

Alternatively, the UE may report the maximum number of CORESETs (with a different TCI state or QCL type-D RS) that the UE can support for BFD use (and/or RLM use) for the entire CORESET pool/group, and may report the maximum number of TCI states/RSs (e.g., 1 or 2) that the UE can support for BFD use (and/or RLM use) per CORESET to the base station (method 4).

The plurality of methods (Methods 1 to 4) described above may be used together with each other. For example, Method 1 and Method 2 may be used together. That is, the UE may report the maximum number of RSs that a UE can support for BFD use (and/or RLM use) per CORESET pool/group and may report the maximum number of RSs that the UE can support for BFD use (and/or RLM use) for the entire CORESET pool/group.

In addition, some or all of the values exemplified in the plurality of methods (methods 1 to 4) may be predefined (or prescribed) values rather than values reported as supportable by the UE. That is, a specific UE may be defined to support RS of a predefined value for BFD use and/or RLM use. Here, the specific UE may mean a UE supporting a method related to M-TRP (e.g., multiple CORESET pool/group, TRP-specific BFR method, CORESET, PDCCH SFN transmission method in which multiple TCI states are configured, etc.), but is not limited thereto.

For example, in the case of a UE supporting a method of improving PDCCH reliability (e.g., a method of repeatedly transmitting PDCCH) based on a single CORESET in which two TCI states are configured, it may be predefined (or prescribed) to support up to two TCI states/RSs for BFD use (and/or RLM use) per CORESET.

In addition, when the plurality of methods (Method 1 to Method 4) are applied, the UE may report a value for a specific or single CC/BWP, and/or a value for a cell group (in a dual connectivity environment), and/or a value for all cells (e.g., by UE). For example, if method 1 is applied, the UE may report to the base station the maximum number of RSs that the UE can support for BFD use for each CORESET pool/group in a specific CC/BWP and/or in a specific cell group and/or in all cells.

In an environment in which a CORESET is configured with multiple TCI states, and/or in an environment where multiple CORESET pools/groups are configured, the burden of calculating the hypothetical BLER for the BFD RS (and/or the RLM RS) of the UE may be increased. The UE may report a value supported by the UE (e.g., the number of BFD/RLM RSs supported by the UE, etc.) to the eNB by using at least one of the plurality of methods (Methods 1 to 4). Accordingly, the base station may configure the BFD/RLM RS for the UE according to the reported value. The UE may expect that the BFD/RLM RS of a value exceeding the reported value is not configured (in units of a specific cell and/or a plurality of cells).

Embodiment 2

For the UE, when single or multiple CORESETs are configured (in a specific CORESET pool/group), and a specific value exceeds the maximum value supported by the UE or the value configured by the base station in relation to BFD and/or RLM, the UE may select CORESET(s) and TCI(s) to be included as BFD-RS (or BFD-RS set) by applying some or all of the following rules (in a specific CORESET pool/group).

Here, the specific value may mean the total number of CORESETs configured for the UE and/or the total number of TCI states configured in the CORESETs and/or the total number of TCI states configured in the specific CORESET.

And, the maximum value supported by the UE in relation to the BFD and/or RLM may include the maximum number of BFD-RS resources per BFD-RS set supported by the UE, and/or the number of total BFD-RS resources that can be included in one or more BFD-RS sets configured for each CC/BWP supported by the UE, etc., but is not limited thereto.

The UE may select CORESET based on the number of configured TCI states (Rule 1). The UE may select a CORESET to be included in the BFD-RS (or BFD-RS set) according to the number of configured TCI states among one or more CORESETs included in a specific CORESET pool/group.

For example, the UE may preferentially select a CORESET with a larger number of configured TCI states (from among CORESETs included in a specific CORESET pool/group) (Rule 1-1). When the number of TCI states configured in a specific CORESET is greater than the number of TCI states configured in other CORESETs, the PDCCH included in the specific CORESET may be more important from the viewpoint of reliability. Accordingly, the UE may preferentially select a specific CORESET in which a large number of TCI states are configured.

As another example, the UE may preferentially select a CORESET with a smaller number of configured TCI states (from among CORESETs included in a specific CORESET pool/group) (Rule 1-2). Since transmission of the PDCCH may be successful only for a primary or specific TRP/panel/beam, the UE may preferentially select a CORESET in which a smaller number of TCI states are configured.

As another example, the UE may apply rule 1-1, rule 1-2, or a rule not giving priority according to the number of TCI states according to a predefined condition. Here, the predefined condition may include whether there is a PDCCH transmission method (e.g., SFN, TDM, SDM, FDM) of a CORESET (or a set of search spaces belonging to a CORESET in which multiple TCI states are configured) in which a plurality of TCIs are configured or whether there is a CORESET/search space set to which the PDCCH transmission method is applied, but is not limited thereto.

The UE may select CORESET based on whether linkage between CORESET/search space sets exists (Rule 2). The UE may select a CORESET to be included in a BFD-RS (or a BFD-RS set) when a linkage exists among one or more CORESETs included in a specific CORESET pool/group. Here, linkage refers to a connection between CORESET/search space sets configured for repeated transmission of the same DCI.

For example, a CORESET in which a linkage exists may be an important CORESET from a reliability point of view, the UE may preferentially select a CORESET in which a linkage exists (or a CORESET including a search space in which a linkage exists) (rule 2-1).

As another example, since transmission of the PDCCH may be successful only for a primary or specific TRP/panel/beam, the UE may preferentially select a CORESET in which a linkage does not exist (or a CORESET including a search space in which a linkage does not exist) (Rule 2-2).

As another example, the UE may apply Rule 1-2, Rule 2-2, or a rule that does not give priority according to the existence of a linkage according to a predefined condition. Here, the predefined condition may include whether there is a PDCCH transmission method (e.g., SFN, TDM, SDM, FDM) of linked CORESET/search space sets or a CORESET/search space set to which the PDCCH transmission method is applied, but is not limited thereto.

The UE may select CORESET according to the transmission type (or method) of the CORESET/search space set (in which a plurality of TCI states are configured) (rule 3).

For example, when selecting a specific CORESET from among a plurality of CORESETs in which the same number of TCI states are configured, the UE may select a specific CORESET based on a PDCCH transmission method (e.g., SFN, TDM, SDM, FDM) of CORESET (or a search space set belonging to CORESET) or whether a CORESET/search space set to which the PDCCH transmission method is applied exists.

The UE may select CORESET according to the period (e.g., monitoring period, etc.) of the search space (set) included in the CORESET (Rule 4).

For example, the UE may preferentially select a CORESET having the shortest search space set period (e.g., monitoring period) among a plurality of CORESETs included in a specific CORESET pool/group (like the RLM RS selection method).

The UE may select a CORESET according to the CORESET ID (Rule 5).

For example, the UE may preferentially select a CORESET having a higher CORESET ID from among a plurality of CORESETs included in a specific CORESET pool/group (like the RLM RS selection method). However, this is only an embodiment, and the UE may preferentially select a CORESET having a lower CORESET ID from among a plurality of CORESETs included in a specific CORESET pool/group.

The UE may select CORESET according to the CORESET pool/group ID (rule 6).

For example, the UE may preferentially select the included CORESET(s) according to a specific CORESET pool/group ID. Here, the specific CORESET pool/group ID may mean a predefined ID (e.g., CORESET Pool ID=0), a CORESET pool/group ID configured/indicated by the base station, or a CORESET pool/group ID having a specific characteristic (e.g., with CORESET with common search space set, or with CORESET 0), but is not limited thereto.

When a plurality of TCI states are configured for CORESET, the UE may select a TCI state according to the order of the plurality of TCI states (rule 7).

For example, the UE may select a TCI state using a predefined rule (e.g., a rule for selecting the first N TCI states from among a plurality of TCI states, etc.) (Rule 7-1).

As another example, the UE may select the TCI state according to the order configured/indicated by the base station (Rule 7-2). For example, the base station may configure, for the UE, which TCI state to select first among the first TCI state or the second TCI state.

If the TPR-specific BFR method is applied, Rules 7-1 and 7-2 may be rules for selecting a specific TCI state from a TCI state to be included as a BFD-RS (or BFD-RS set) for a specific TRP (e.g., CORESET pool/group) among a plurality of TCI states belonging to a specific CORESET (by other rules stipulated/configured in relation to TRP-specific BFR behavior).

For example, it is assumed that CORESET with TCI state #0, 1, 2, 3 exists, TCI states #0 and #3 are included in BFD-RS set #0 for TRP #0, and TCI states #1 and #2 are included in BFD-RS set #1 for TRP #1. In this case, rules 7-1 and 7-2 may be rules for selecting (i.e., preferentially selecting) a specific TCI state among TCI states included in each BFD-RS set. That is, Rule 7-1 and Rule 7-2 are a rule to select a specific TCI state from TCI state #0 and TCI state #3 and/or a rule to select a specific TCI state from TCI state #1 and TCI state #2.

The UE may select a specific RS within the TCI state according to the QCL parameter/type (Rule 8).

For example, when a plurality of RSs are included in a single TCI state (like the RLM RS/BFD RS selection method), the UE may preferentially select a QCL type-D RS for a beam-related QCL parameter among the plurality of RSs.

As another embodiment of the present disclosure, in a multi-CC operating environment in which carrier aggregation or dual connectivity is configured, a rule for preferentially selecting a BFD/RLM RS for a specific CC/BWP may be required. Rules 9 and 10, which will be described later, relate to rules for preferentially selecting a specific CC/BWP in a multi-CC operating environment.

The UE may select a specific CC/BWP according to the type/property of the CC/BWP (Rule 9).

Rule 9 is a rule for preferentially selecting a specific CC/BWP according to the type or characteristic of the CC/BWP. For example, rule 9 may include a rule for preferentially selecting a PCell or a PSCell over an SCell or a rule for preferentially selecting a PCell over a PScell.

The UE may select a specific CC/BWP according to the ID of the CC/BWP (Rule 10).

Rule 10 is a rule for preferentially selecting a specific CC/BWP according to the ID of the CC/BWP. For example, rule 10 may include a rule for preferentially selecting a CC/BWP having a low ID or a high ID.

The UE may use/apply at least one rule among the plurality of rules (rule 1 to rule 10) described above, and whether a rule is preferentially applied among the plurality of rules may be additionally defined.

For example, rules that select CC/BWP (Rule 9 and Rule 10), rules that select CORESET within CC/BWP (Rule 1 to Rule 6), a rule that selects a TCI state within CORESET (Rule 7), and a rule that selects RS within TCI state (Rule 8) may be applied to the UE.

In addition, rule 10 may be applied after rule 9 is preferentially applied to CC/BWP selection. In addition, rules 1/2/3 are preferentially applied to the CORESET selection, and then rules 4,5 may be applied in order, but are not limited thereto. After rule 4 is applied for coreset selection, rule 1/2/3 and rule 5 may be applied in order.

The order of application of the above-described plurality of rules (rule 1 to rule 10) is only an example, and each rule may be applied in various orders. The above-mentioned rules and the order in which the rules are applied may be predefined or may be configured/indicated by the base station for the UE.

When the RLM/BFD RS is explicitly configured by the base station, CORESET selection in CC/BWP, TCI state selection in CORESET, and RS selection in TCI may be unnecessary. Therefore, some (or all) of the above-described plurality of rules (rule 1 to rule 10) may be limitedly applied to a case in which the RLM/BFD RS is not explicitly configured by the base station through an RRC message or the like.

Figure 8:
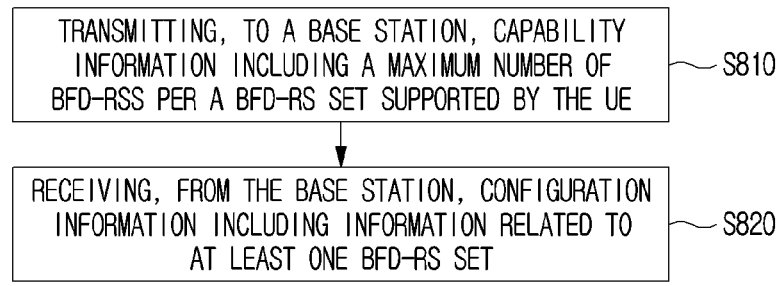
FIG. 8 is a diagram for describing a beam failure recovery operation of a terminal according to an embodiment of the present disclosure.

FIG. 8 is a diagram for describing a beam failure recovery operation of the UE according to an embodiment of the present disclosure.

The UE may transmit capability information including the maximum D of BFD-RSs per a beam failure detection-reference signal (BFD-RS) set supported by the UE to the base station (S810). That is, the capability information reported from the UE to the base station may include the maximum number of BFD-RSs per one BFD-RS set supported by the UE.

Here, the BFD-RS may include at least one of a CSI-RS and a synchronization signal block (SSB), but is not limited thereto.

And, in describing the present disclosure, a BFD-RS set may be expressed as a BFD-RS resource set, and a BFD-RS may be expressed as a BFD-RS resource.

The UE may receive configuration information including information related to at least one BFD-RS set from the base station (S820). Here, each of the at least one BFD-RS set may include the maximum number of BFD-RSs included in the capability information transmitted to the base station.

Here, the information related to at least one BFD-RS set may include configuration information on one or more TCI states configured for a specific CORESET. A BFD-RS to be included in the BFD-RS set may be implicitly configured based on one or more TCI states configured for a specific CORESET.

As another example, information related to at least one BFD-RS set may include information indicating an RS (or RS resource) included in each BFD-RS set. That is, the RS (or RS resource) included in the BFD-RS set may be explicitly indicated (or configured) by the base station.

Hereinafter, the present disclosure will be described on the assumption that two BFD-RS sets are configured according to the configuration information received from the base station. However, this is only an embodiment, and the present disclosure may be extended and applied even when three or more BFD-RS sets are configured.

Each of the at least one BFD-RS set may correspond to one or more CORESET groups. For example, the at least one BFD-RS set may include a first BFD-RS set and a second BFD-RS set. In addition, the first BFD-RS set may correspond to the first CORESET group, and the second BFD-RS set may correspond to the second CORESET group.

Here, the CORESET group may mean a CORESET pool introduced for multiple DCI-based M-TRP PDSCH transmission or a group including one or more CORESETs for a separate purpose. And, the CORESET group may correspond to the TRP. For example, the first CORESET group may correspond to TRP 1, and the second CORESET group may correspond to TRP 2.

One or more CORESETs may be included in a CORESET group. In addition, one or more transmission configuration indicators (TCIs) may be configured in CORESET.

The TCI state may correspond to one or more RSs (or one RS set). That is, the TCI state may include information indicating one or more RSs having a QCL relationship. The ID of one or more RSs (or one RS set) corresponding to the TCI state may indicate/refer to an RS (e.g., CSI-RS, SSB, etc.) for quasi co-location (QCL) indication (e.g., QCL type-D related to spatial parameters).

And, "RS with QCL relationship" indicated by the TCI state may be referred to as "QCL source RS" or "QCL reference RS". The RS having the QCL relationship indicated by the TCI state may correspond to the BFD-RS.

Based on the number of TCI states configured for at least one COREST included in the first CORESET group or the second CORESET group being more than the maximum number included in the capability information (that is, the maximum number of BFD-RSs), a BFD-RS corresponding to a TCI state to be included in the first BFD-RS set or the second BFD-RS set may be determined based on a monitoring periodicity of a search space corresponding to each of at least one CORESET.

For example, the BFD-RS corresponding to the TCI state set in the CORESET having the shortest monitoring period of the search space among at least one CORESET may be preferentially included in the first BFD-RS set or the second BFD-RS set.

That is, the UE may select CORESET according to the ascending order of the monitoring period of the corresponding search space. The UE may preferentially select (or determine) CORESETs in the order of the shortest monitoring periodicity of the search space in at least one CORESET, and may determine that the BFD-RS corresponding to the TCI state configured in the selected specific CORESET is included in the first BFD-RS set or the second BFD-RS set.

In another embodiment of the present disclosure, based on the monitoring periodicity of the search space corresponding to each of at least one CORESET being same, a CORESET in which a TCI state corresponding to a BFD-RS to be included in the first BFD-RS set or the second BFD-RS set is configured may be determined based on an index value of the at least one CORESET.

That is, when the monitoring periodicity of the search space corresponding to each CORESET included in the CORESET group is the same, the UE may determine the CORESET in which the TCI state corresponding to the BFD-RS to be included in the BFD-RS set is configured based on the index value of each CORESET.

For example, the BFD-RS corresponding to the TCI state configured in the CORESET having the largest index value among at least one CORESET may be determined to be preferentially included in the first BFD-RS set or the second BFD-RS set. That is, the UE may determine the CORESET according to the descending order of the CORESET index values. The UE may select (or determine) CORESETs in the order of the largest index values in at least one CORESET, and may determine that the BFD-RS corresponding to the TCI state configured in the selected specific CORESET is included in the first BFD-RS set or the second BFD-RS set.

However, this is only an example, and the BFD-RS corresponding to the TCI state configured in the CORESET having the smallest index value among at least one CORESET may be determined to be preferentially included in the first BFD-RS set or the second BFD-RS set.

In another embodiment of the present disclosure, the UE may receive information configuring/indicating a method of configuring a BFD-RS set from the base station. For example, the UE may receive information for configuring/indicating a TCI state corresponding to a BFD-RS to be included in the BFD-RS set and/or a method of determining a CORESET corresponding to the TCI state from the base station through an RRC message/MAC-CE/DCI.

In another embodiment of the present disclosure, the capability information reported from the UE to the base station may include the total number of BFD-RSs that can be included in the first BFD-RS set and the second BFD-RS set supported by the UE, and/or the number of TCI states configured for at least one CORESET included in the first CORESET group or the second CORESET group supported by the UE.

In addition, the UE may perform a beam failure detection operation by detecting a beam failure instance (BFI) in the first BFD-RS set and/or the second BFD-RS set including the maximum number of BFD-RSs.

Figure 9:
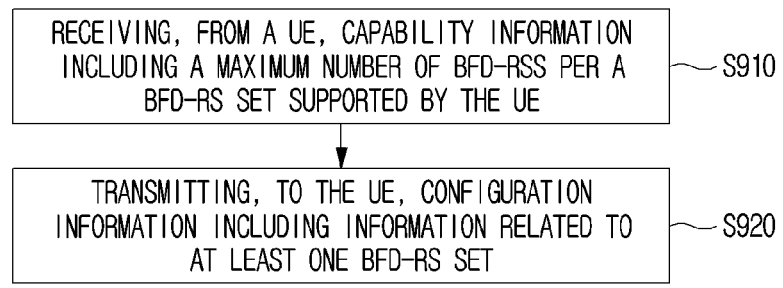
FIG. 9 is a diagram for describing a beam failure recovery operation of a base station according to an embodiment of the present disclosure.

FIG. 9 is a diagram for describing a beam failure recovery operation of a base station according to an embodiment of the present disclosure.

The base station may transmit capability information including the maximum number of BFD-RSs per BFD-RS set supported by the UE to the base station (S910).

That is, the capability information reported from the UE to the base station may include the maximum number of BFD-RSs that can be included in one BFD-RS set supported by the UE.

The base station may transmit configuration information including information related to at least one BFD-RS set to the UE (S920).

Here, the information related to at least one BFD-RS set may include configuration information on one or more TCI states configured for a specific CORESET. As another example, information related to at least one BFD-RS set may include information indicating an RS (or RS resource) included in each BFD-RS set.

For example, the base station may configure, for the UE, one or more BFD-RS sets including the maximum number of BFD-RSs included in the capability information received from the UE.

Since specific examples and descriptions related to the TCI state, CORESET, CORESET group, and BFD-RS have been described with reference to FIG. 8, duplicate descriptions will be omitted.

In an embodiment of the present disclosure, the base station may transmit information configuring/indicating a method of configuring a BFD-RS set to the UE. For example, the base station may transmit information for configuring/indicating a TCI state corresponding to a BFD-RS to be included in the BFD-RS set and/or a method of determining a CORESET corresponding to the TCI state to the UE through an RRC message/MAC-CE/DCI.

However, this is only an example, and the UE may determine the TCI state corresponding to the BFD-RS to be included in the BFD-RS set and/or the CORESET corresponding to the TCI state based on at least one of the CORESET ID and the monitoring periodicity of the search space corresponding to the CORESET. Since the related embodiment has been described in detail with reference to FIG. 8, a duplicate description will be omitted.

Based on detecting the BFI of a predetermined number of times or more in the first BFD-RS set and/or the second BFD-RS set including the maximum number of BFD-RSs based on the capability information in the UE, the base station may receive a beam failure recovery request (BFRQ) from the UE. Here, the predetermined number of times may mean a value configured by a higher layer parameter (e.g., 'beamFailureInstanceMaxCount').

The base station may transmit a response to the BFRQ to the UE. For example, when a contention-free PRACH resource and a preamble are received from the UE as BFRQ, the base station may transmit a response including an uplink grant DCI included in the PDCCH masked with the C-RNTI to the UE. As another example, when a contention-free PRACH resource and a preamble are received from the UE as BFRQ, the base station may transmit a response to the UE using CORESET configured for a basic contention-free PRACH-based random access procedure.

Figure 10:
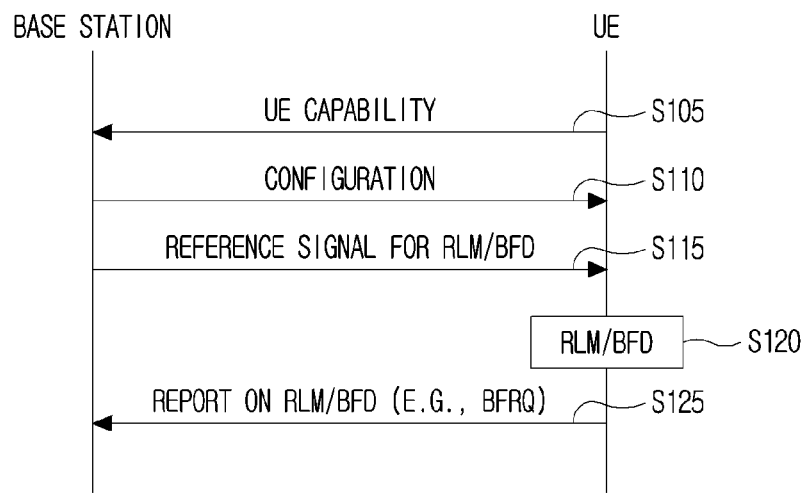
FIG. 10 is a diagram for describing a signaling procedure of a network side and a terminal according to the present disclosure.

FIG. 10 is a diagram for describing a signaling procedure of the network side and the UE according to the present disclosure.

FIG. 10 shows an example of signaling between a network side and a UE in an M-TRP situation to which examples of the present disclosure described above (e.g., a combination of one or more of embodiment 1, embodiment 2, or detailed embodiments thereof) may be applied. Here, UE/a network side is illustrative and may be applied by being substituted with a variety of devices as described by referring to FIG. 11. FIG. 10 is for convenience of description, and it does not limit a scope of the present disclosure. In addition, some step(s) shown in FIG. 10 may be omitted according to a situation and/or a configuration, etc. In addition, the above-described uplink transmission and reception operation, a M-TRP-related operation, etc. may be referred to or used for an operation of a network side/UE in FIG. 10.

In the following description, a network side may be one base station including a plurality of TRPs or may be one cell including a plurality of TRPs. Alternatively, a network side may include a plurality of RRHs (remote radio head)/RRUs (remote radio unit). In an example, an ideal/non-ideal backhaul may be configured between TRP 1 and TRP 2 configuring a network side. In addition, the following description is described based on a plurality of TRPs, but it may be equally extended and applied to transmission through a plurality of panels/cells and may be extended and applied to transmission through a plurality of RRHs/RRUs, etc.

In addition, it is described based on a "TRP" in the following description, but as described above, a "TRP" may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., a CORESET index, an ID). In an example, when one UE is configured to perform transmission and reception with a plurality of TRPs (or cells), it may mean that a plurality of CORESET groups (or CORESET pools) are configured for one terminal. A configuration on such a CORESET group (or a CORESET pool) may be performed through higher layer signaling (e.g., RRC signaling, etc.).

In addition, a base station may generally mean an object which performs transmission and reception of data with a terminal. For example, the base station may be a concept which includes at least one TP (Transmission Point), at least one TRP (Transmission and Reception Point), etc. In addition, a TP and/or a TRP may include a panel, a transmission and reception unit, etc. of a base station.

The UE may report RLM/BFD-related UE capability information to the network side by the method according to the above-described embodiment (e.g., a combination of one or more of Embodiment 1, Embodiment 2, or detailed Embodiments thereof) (S105). The UE may receive configuration information for M-TRP-based transmission/reception through/using TRP 1 and/or TRP 2 from the network side (S110).

The configuration information may include information related to a network-side configuration (i.e., TRP configuration), resource allocation related to M-TRP-based transmission and reception, and the like. In this case, the configuration information may be transmitted through higher layer signaling (e.g., RRC signaling, MAC-CE, etc.). In addition, when the configuration information is predefined or configured, the corresponding step may be omitted.

For example, as in the above-described embodiment (e.g., Embodiment 1, Embodiment 2, or a combination of one or more of detailed examples), the configuration information may include CORESET-related configuration information (e.g., ControlResourceSet IE). The CORESET-related configuration information may include a CORESET-related ID (e.g., controlResourceSetID), an index of the CORESET pool for CORESET (e.g., CORESETPoolIndex), time/frequency resource configuration of CORESET, TCI information related to CORESET, etc. For example, the configuration information may include information related to RLM/BFR, etc. as described in the above-described embodiments (e.g., a combination of one or more of embodiment 1, embodiment 2, or detailed embodiments thereof). For example, the TCI information related to the CORESET may be information on one or a plurality of TCI state(s) for each CORESET.

For example, an operation that UE (100 or 200 in FIG. 11) in the above-described stage S115 receives the configuration information from a network side (200 or 100 in FIG. 11) may be implemented by a device in FIG. 11 which will be described after. For example, in reference to FIG. 11, at least one processor 102 may control at least one transceiver 106 and/or at least one memory 104, etc. to receive the configuration information and at least one transceiver 106 may receive the configuration information from a network side.

The UE may receive a reference signal for RLM/BFD through/using TRPs from the network side (S115). For example, RS 1/RS 2 for the RLM/BFD may be SSB/CSI-RS.

For example, an operation that UE (100 or 200 in FIG. 11) in the above-described stage S115 transmits the reference signal to a network side (200 or 100 in FIG. 11) may be implemented by a device in FIG. 11 which will be described after. For example, in reference to FIG. 11, at least one processor 102 may control at least one transceiver 106 and/or at least one memory 104, etc. to transmit the reference signal and at least one transceiver 106 may transmit the reference signal to a network side.

The UE may perform RLM/BFD based on the RS 1 and/or RS 2 received from the network side through/using TRP 1 and/or TRP 2 (S120). For example, the RLM/BFD operation may be performed based on the above-described embodiment (e.g., embodiment 1, embodiment 2, or a combination of one or more of the detailed examples thereof). or the like. For example, the UE may measure/estimate a hypothetical BLER based on the reception quality of RS 1 and/or RS 2, and may determine whether BF/out-of-synch/in-synch accordingly.

For example, if both RS 1 and RS 2 are active as the TCI state for a specific CORESET, the UE may determine (or perform) whether to consider both RS 1 and RS 2 as RLM/BFD RS and perform RLM/BFD procedures, whether to consider RLM/BFD RS only for one specific RS and perform RLM/BFD procedures, or whether or not both RSs are considered RLM/BFD RSs, based on the embodiment of the present disclosure (e.g., a combination of one or more of embodiment 1, embodiment 2, or detailed embodiments thereof), etc.

For example, the operation of the UE (100 or 200 in FIG. 11) performing RLM/BFR in step S120 described above may be implemented by the apparatus of FIG. 11 below. For example, referring to FIG. 11, one or more processors 102 may control one or more memories 104 and the like to perform the RLM/BFR operation.

The UE may transmit a report (e.g., BFRQ) for the RLM/BFR to the network side through/using TRP 1 and/or TRP2 (S125). In this case, the report on the RLM/BFR for TRP 1 (e.g., BFRQ, etc.) and the report on the RLM/BFR for TRP 2 (e.g., BFRQ, etc.) may be transmitted, respectively, or may be combined into one. In addition, the UE is configured to transmit a report on RLM/BFR to the representative TRP (e.g., TRP 1), and transmission of a report (e.g., BFRQ, etc.) for RLM/BFR to another TRP (e.g., TRP 2) may be omitted. Alternatively, the UE may be configured to transmit a BFR report (e.g., BFRQ, etc.) in the same TRP as the TRP in which the beam failure occurred. Alternatively, the UE may be configured to transmit a report on RLM/BFR (e.g., BFRQ, etc.) in TRP rather than TRP in which beam failure occurs.

For example, the network side that has received a report/BFRQ for BF through/using TRP 1 and/or TRP 2 from the UE may transmit new RLM/BM/BFR-related RS information for beam recovery to the UE.

For example, the operation in which the UE (100/200 in FIG. 11) in step S125 described above transmits a report (e.g., BFRQ, etc.) for RLM/BFR from the network side (200/100 in FIG. 11) may be implemented by the apparatus of FIG. 11 to be described below. For example, referring to FIG. 11, the one or more processors 102 may control one or more transceivers 106 and/or one or more memories 104, etc. to transmit a report for RLM/BFR (e.g., BFRQ, etc.), and the one or more transceivers 106 may transmit a report (e.g., BFRQ, etc.) for RLM/BFR to the network side.

As mentioned above, the network-side/UE operation described above (e.g., embodiment 1, embodiment 2, or a combination of one or more of the detailed examples thereof) may be implemented by an apparatus (e.g., the apparatus of FIG. 11) to be described below. For example, the UE may correspond to a first wireless device 100, the network side may correspond to a second wireless device 200, and vice versa may be considered in some cases.

Figure 11:
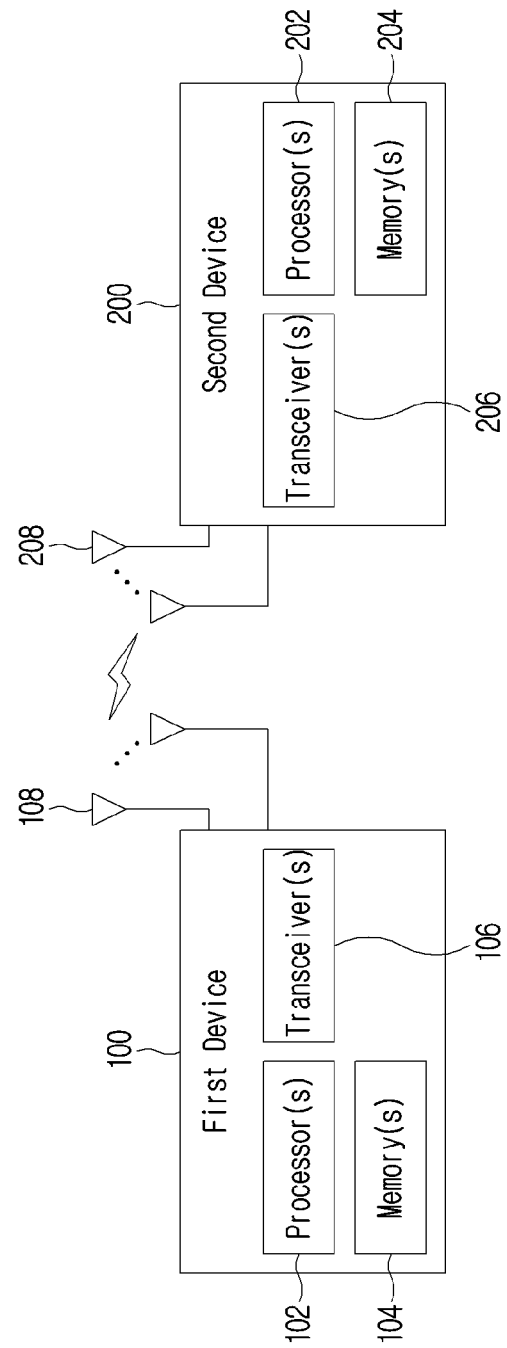
FIG. 11 illustrates a block diagram of a wireless communication system according to an embodiment of the present disclosure.

For example, the network-side/UE operation described above (e.g., embodiment 1, embodiment 2, or a combination of one or more of the detailed examples thereof) may be processed by one or more processors (e.g., 102, 202) of FIG. 11, and the above-described network-side/UE operations (e.g., embodiment 1, embodiment 2, or a combination of one or more of the detailed examples thereof) may be stored in the memory (e.g., one or more memories (e.g., 104, 204) of FIG. 11) in the form of instructions/programs (e.g., instructions, executable code) for driving one or more processors (e.g., 102 and 202) of FIG. 11.

General Device to which the Present Disclosure May be Applied

FIG. 11 is a diagram which illustrates a block diagram of a wireless communication system according to an embodiment of the present disclosure.

In reference to FIG. 11, a first device 100 and a second device 200 may transmit and receive a wireless signal through a variety of radio access technologies (e.g., LTE, NR).

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method performed by a user equipment (UE) in a wireless communication system, the method comprising:
   transmitting, to a base station, capability information related to a beam failure recovery (BFR) including a maximum number of beam failure detection-reference signal (BFD-RS) resources per a BFD-RS set per a bandwidth part (BWP); and
   receiving, from the base station, configuration information including information related to at least one transmission configuration indicator (TCI) state configured for at least one of a first control resource set (CORESET) group or a second CORESET group,
   wherein based on a radio resource control (RRC) signaling for configuring a first BFD-RS set or a second BFD-RS set being not received from the base station:
   based on a number of active TCI states configured for the first CORESET group corresponding to the first BFD-RS set or the second CORESET group corresponding to the second BFD-RS set being more than the maximum number of the BFD-RS resources, the first BFD-RS set or the second BFD-RS set is determined to include at least one BFD-RS resource associated with the active TCI states for the first CORESET group or the second CORESET group.

2. The method of claim 1, wherein:
   a BFD-RS resource corresponding to an active TCI state configured for a CORESET having a shortest monitoring periodicity of a search space set among at least one CORESET in the first CORESET group or the second CORESET group is included first in the first BFD-RS set or the second BFD-RS set.

3. The method of claim 1, wherein:
   based on a monitoring periodicity of a search space set corresponding to multiple CORESETs in the first CORESET group or the second CORESET group being same, an order of the multiple CORESETs is determined based on an index value of the multiple CORESETs.

4. The method of claim 3, wherein:
   a BFD-RS resource corresponding to an active TCI state configured for a CORESET having a highest index value among the multiple CORESETs in the first CORESET group or the second CORESET group is included first in the first BFD-RS set or the second BFD-RS set.

5. The method of claim 1, wherein:
   the capability information includes a total number of BFD-RSs that can be included in the first BFD-RS set and the second BFD-RS set supported by the UE.

6. The method of claim 1, further comprising:
   detecting a beam failure instance (BFI) in the first BFD-RS set or the second BFD-RS set.

7. The method of claim 1, wherein:
   the BFD-RS includes a channel state information-reference signal (CSI-RS).

8. The method of claim 1, wherein:
the active TCI state includes information indicating a RS index having a quasi-co-location (QCL) relationship.

9. The method of claim 1, wherein:
the configuration information includes information indicating a RS index included in each of BFD-RS set.

10. A user equipment (UE) configured to operate in a wireless communication system, the UE comprising:
at least one transceiver; and
at least one processor coupled to the at least one transceiver,
the at least one processor is configured to:
transmit, to a base station, capability information related to a beam failure recovery (BFR) including a maximum number of beam failure detection-reference signal (BFD-RS) resources per a BFD-RS set per a bandwidth part (BWP), through the at least one transceiver; and
receive, from the base station, configuration information including information related to at least one transmission configuration indicator (TCI) state configured for at least one of a first control resource set (CORESET) group or a second CORESET group, through the at least one transceiver,
wherein based on a radio resource control (RRC) signaling for configuring a first BFD-RS set or a second BFD-RS set being not received from the base station:
based on a number of active TCI states configured for the first CORESET group corresponding to the first BFD-RS set or the second CORESET group corresponding to the second BFD-RS set being more than the maximum number of the BFD-RS resources, the first BFD-RS set or the second BFD-RS set is determined to include at least one BFD-RS resource associated with the active TCI states for the first CORESET group or the second CORESET group.

11. A method performed by a base station in a wireless communication system, the method comprising:
receiving, from a user equipment (UE), capability information related to a beam failure recovery (BFR) including a maximum number of beam failure detection-reference signal (BFD-RS) resources per a BFD-RS set per a bandwidth part (BWP); and
transmitting, to the UE, configuration information including information related to at least one transmission configuration indicator (TCI) state configured for at least one of a first control resource set (CORESET) group or a second CORESET group,
wherein based on a radio resource control (RRC) signaling for configuring a first BFD-RS set or a second BFD-RS set being not transmitted to the UE:
based on a number of active TCI states configured for the first CORESET group corresponding to the first BFD-RS set or the second CORESET group corresponding to the second BFD-RS set being more than the maximum number of the BFD-RS resources, the first BFD-RS set or the second BFD-RS set is determined to include at least one BFD-RS resource associated with the active TCI states for the first CORESET group or the second CORESET group.

* * * * *